A. N. Elzy.
Churn.
No 71289. Patented Nov. 26, 1867.
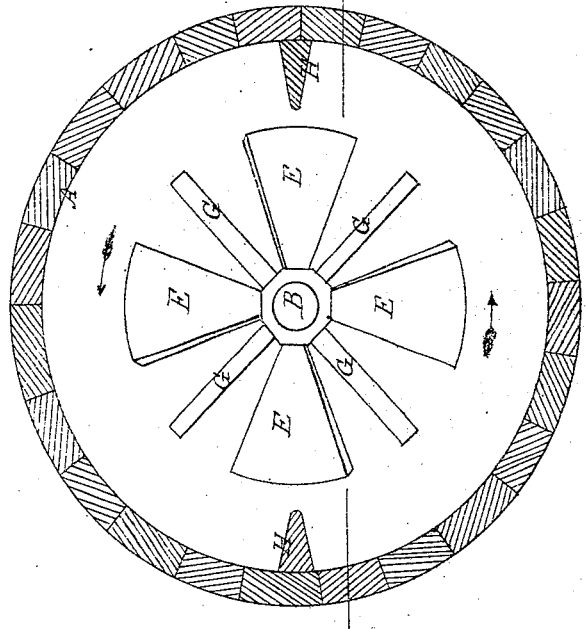
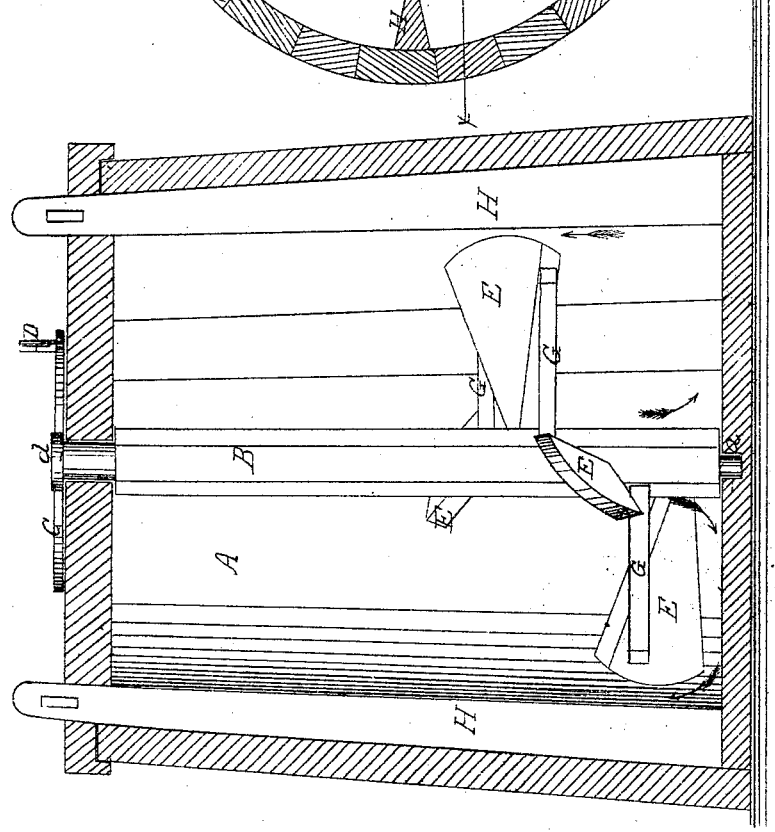
Witnesses
W. M. Smith
Gm B Mansby
Inventor
Andrew N. Elzy

United States Patent Office.

ANDREW N. ELZY, OF PLACERVILLE, CALIFORNIA.

Letters Patent No. 71,289, dated November 26, 1867.

IMPROVEMENT IN CHURNS.

The Schedule referred to in these Letters Patent and making part of the same.

TO ALL WHOM IT MAY CONCERN:

Be it known that I, ANDREW N. ELZY, of Placerville, county of El Dorado, State of California, have invented certain new and useful Improvements in Churns; and I do hereby declare the following description and accompanying drawings are sufficient to enable any person skilled in the art or science to which it most nearly appertains to make and use my said invention or improvements without further invention or experiment.

The object of my invention is to construct an improved churn, by the use of which cream may be expeditiously converted into butter, and the butter, when made, will be kept together in a mass, and not separated as by some methods.

To do this I provide a cylindrical barrel to hold the cream. Through the centre of this barrel a shaft passes, standing upright, and turning in a step at the bottom. This shaft is revolved by a crank, and may have gearing to give it greater speed. On the shaft, and radiating from it, are arms, so placed that they form a sort of screw, the tendency of which is to force the cream to the bottom of the churn, in the centre, whence it arrives at the sides to again undergo the same process. Two posts are placed at opposite sides of the churn to prevent the rotary motion which the cream would otherwise acquire.

To more fully explain my invention, reference is had to the accompanying drawings, forming part of this specification, of which—

Figure 1 is a side sectional elevation taken through $x\ x$.

Figure 2 is a top view, with the cover removed.

Similar letters of reference indicate like parts in each of the drawings.

A is the barrel of the churn, and B an upright shaft, turning in a step, $a$, at the bottom. At the top is a wheel, C, with a crank, D. This wheel turns the pinion $d$, which is fastened to the top of the shaft B. Radial vanes E E E are fastened to the upright shaft, and so placed that they form a spiral around it. Between these vanes are the straight arms G G G. Two posts H H are placed at each side of the churn to prevent the cream moving about with the dasher, or the containing-box may be made square, when its shape will answer the same purpose.

To operate this churn, it is filled with cream in the proper state, and the shaft B with its vanes E E turned in the direction shown by the arrows in fig. 2. This motion, besides agitating the cream, forces it to the bottom of the churn, by means of the spiral vanes, and it then passes up at the sides and down again in the centre. By this motion the cream is thoroughly churned, but not beaten to pieces, so that, when turned to butter, it will be gathered into a mass by the dasher and made ready to work.

I claim a churn-dasher with a central revolving shaft, B, carrying oblique arms E and square arms G, alternating with each other, and spirally arranged upon the shaft.

In witness whereof I have hereunto set my hand and seal.

ANDREW N. ELZY. [L. S.]

Witnesses:
C. W. M. SMITH,
GUS. S. MANTLEY.